United States Patent Office 3,102,910
Patented Sept. 3, 1963

3,102,910
PREPARATION OF TERTIARY DIHALOPHOSPHORIC ACID AMIDES
Heyme Breederveld, Eindhoven, Netherlands, assignor to Shell Oil Company, New York, N.Y., a corporation of Delaware
No Drawing. Filed July 28, 1961, Ser. No. 127,498
Claims priority, application Netherlands Oct. 21, 1960
7 Claims. (Cl. 260—543)

This invention relates to a process for the production of tertiary dihalophosphoric acid amides and to certain novel tertiary dihalophosphoric acid amides having a substituted or unsubstituted vinyl group bound to the nitrogen.

It is known that tertiary acid amides may be prepared from secondary amines which are acetylated with acetic anhydride at the nitrogen atom, the hydrogen atom thus being replaced by an acetyl group. Such a process is discussed in U.S. Patent 2,446,172 which provides for acetylating 2-alkylamino-1,3-butadiene or 2-arylamino-1,3-butadiene. Other related teachings are found in U.S. Patents 2,231,905, 2,585,230, 2,717,886 and in German Patent 877,757.

It is a principal object of the present invention to provide an improved process for the synthesis of tertiary dihalophosphoric acid amides and certain novel dihalophosphoric acid amides in which a substituted or unsubstituted vinyl group is bound directly to the nitrogen atom.

In accordance with the present invention, an aldimine or ketimine is slowly added to a warm solution of phosphoroxy halide and a tertiary amine in an inert solvent. In this manner the addition of the phosphoroxy halide to the C=N bond of the ketimine or aldimine and the splitting off of hydrogen halide is accomplished in a single stage. With other acid halides (acetyl chloride, for example) and acid anhydrides (for example, acetic anhydride) it is invariably necessary to proceed in two steps in order to obtain good yields. Ordinarily, the addition of the acid anhydride or acid halide to the C=N bond would be carried out in the cold, followed by splitting off the acid by heat, as is disclosed in copending U.S. application No. 71,409, filed November 25, 1960. Surprisingly, it has been found that when using phosphoroxy halides the yields of the corresponding tertiary dihalophosphoroxy amides are unexpectedly increased by the use of the improved one-step process of the present invention. In this improved process, the aldimine or ketimine is directly added to a warm solution of a phosphoroxy halide and a tertiary amine.

It has been discovered that the yield of the tertiary dihalophosphoroxy amide compounds is greatly increased by this one-step process. At the same time, the manipulative operations of the process have been substantially simplified. In addition, the time required to complete the desired reaction has been materially reduced by the use of the present process.

The invention therefore provides an improved process for the production of tertiary dihalophosphoric acid amides with a substituted or unsubstituted vinyl group directly bound to the nitrogen atom by reacting a phosphoroxy halide, preferably of a middle halide (bromide and chloride), with an aldimine or ketimine of the general formula:

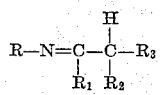

where R is an organic group and $R_1$, $R_2$ and $R_3$ are organic groups, hydrogen, or halogen atoms, in the presence of a tertiary amine. The R, $R_1$, $R_2$ and $R_3$ are preferably aliphatic hydrocarbon groups or hydrogen and the total number of carbon atoms in the imine is preferably from 3 to 12. In the process of the present invention, the aldimine or ketimine reactant is slowly added to a warm solution of a phosphoroxy halide and a tertiary amine in an inert solvent.

The aldimine or ketimine and the phosphoroxy halide are preferably reacted in approximately equimolar amounts. The tertiary amine is preferably used in slight excess. Good results are obtained with the use of approximately 1.1 moles of tertiary amine per mole of phosphoroxy halide.

Suitable starting imines in the process of the present invention are the N-alkyl aldimines, e.g., N-propyl acetaldimine, N-propyl propanaldimine and N-propyl butanaldimine, and the N-alkyl ketimines, e.g., N-propyl dimethyl ketimine.

Tertiary amines suitable for use in the present invention include trialiphatic amines, especially lower aliphatic amines of from 3 to 12 carbon atoms, e.g., triethyl amine, and basic heterocyclic amines, e.g., pyridine, and lower alkyl pyridines of from 1 to 6 alkyl-carbon atoms.

The reaction is carried out at a temperature exceeding 40° C. Generally the process is conducted at a temperature between 50° and 150° C. In any case, the temperature must be sufficient to allow formation of the tertiary dihalophosphoric acid amides without undue decomposition.

Suitable inert solvents which are used in the process include hydrocarbons such as benzene, toluene, xylene or hexane, although any solvent inert under the reaction conditions is suitable.

In carrying out the process of this invention the aldimine or ketimine is preferably slowly added to a boiling solution of the phosphoroxy halide and the tertiary amine in benzene.

The tertiary dihalophosphoroxy amides having substituted and unsubstituted vinyl groups bound to the nitrogen atom may be recovered from the reaction mass by first filtering therefrom any insoluble salts and then distilling the product from the reaction mixture. Other suitable methods for separating the reaction product will readily occur to those skilled in the art.

The dihalophosphoric acid amides obtained in the process of this invention can be used as chemical intermediates, e.g., in the preparation of insecticidal compounds, such as by bromination of the vinyl group to prepare active dibromo insecticides. The dihalo compound can be hydrolyzed to the corresponding acid or esterified to provide the corresponding N-vinyl substituted amidophosphate ester. The compounds of this invention can also be polymerized or copolymerized with other unsaturated compounds. Thus, they may be used for modifying the properties of known polymers and copolymers and they may be used in the preparation of polymeric oil additives.

Novel compounds such as tertiary dihalophosphoric acid amides having a substituted or unsubstituted vinyl group directly bound to the nitrogen atom may also be obtained through the use of phosphoroxy halide as a reactant.

Details of the process of the present invention may best be described by the following examples. It is to be understood that the examples are offered only for illustrative purposes and are not to be construed as limiting the invention in any respect.

*Example I*

A solution of 55 g. (.56 mole) of N-propyl propionaldimine in 150 ml. of benzene was added over a period of 1¼ hours to a boiling solution of 85 g. (0.55 mole) of phosphoroxy chloride and 60 g. (0.59 mole) of triethylamine in 350 ml. of benzene. After all the aldimine had been added, the reaction mixture was boiled for a further 15 minutes. The triethylamine hydrochloride was filtered off. Yield: 77 g. Distillation of the filtrate yielded 61 g. of propyl-1-propenyl amidodichlorophosphate having a boiling range of from 78°–80° C. at 0.6 mm. mercury, $N_D^{20}=1.4861$. The yield was 51%.

*Example II*

Fifty-five grams of N-propyl propanaldimine in 150 ml. of benzene was added to 85 g. of $POCl_3$ and 65 g. of triethylamine in 350 ml. of benzene. Reaction temperature 5–10° C. The mixture was allowed to stand overnight at room temperature and then refluxed for 0.25 hour. After cooling, 82 g. of triethylamine hydrochloride was separated by filtration. Vacuum distillation of the filtrate yielded 36 g. of $POCl_2N(C_3H_7)CH=CHCH_3$ (propyl-1-propenyl amidodichlorophosphate). Yield: 30%; boiling range: 71–76° C. at 0.5 mm. Hg.

It is readily seen that the one-step process of Example I, besides being much simpler as far as laboratory manipulations are concerned, takes less time and gives much better yields than the two-step process.

Other specific reactants may be reacted similarly to the preparation shown in Example I. For example, phosphoroxy bromide ($POBr_3$) reacts with ethyl acetaldimine in the presence of trimethylamine to give ethyl-vinyl amidodibromophosphate and with methyl dimethyl ketimine to give methyl-isopropenyl amidodibromophosphate.

From the foregoing it will be noted that secondary amines are not contemplated as starting materials herein, but rather an imine is specified. Furthermore, the reaction occurs at an elevated temperature as distinguished from acetylation in the cold.

Moreover, it will be appreciated that tautomerism of imines and enamines is well known in the art, e.g., in Ber. 75, 1892–1911 (1941), and Ber. 88, 883–94 (1955), are set forth examples referring to imines in which a hydrogen atom is bonded to the nitrogen atom. However, there is serious doubt that the present invention involves any tautomerism with its substituted imines. Furthermore, the literature teaches that the formation of enamine is promoted by a favorable energy balance. The present invention differs therefrom in that this favorable energy relationship is generally absent and as a result thereof tautomerism will either not occur at all or at least takes place in only a limited fashion.

I claim as my invention:

1. A process for preparing tertiary dihalophosphoric acid amides of the formula:

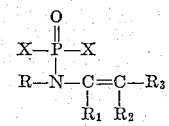

which comprises slowly adding an imine with a total of from 3 to 12 carbon atoms in the molecule of the formula:

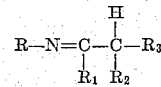

wherein X represents a middle halide, and each of R, $R_1$, $R_2$ and $R_3$ is selected from the group consisting of hydrogen and an aliphatic hydrocarbon, to a phosphoroxy middle halide and a tertiary amine in an inert solvent at a temperature between 40° C. and about 150° C.

2. The process of claim 1 wherein about equimolar amounts of said imine and phosphoroxy middle halide are reacted.

3. The process of claim 2 wherein a molar excess of tertiary amine is used.

4. The process of claim 1 wherein the imine is an N-alkyl imine in which the alkyl-moiety R contains from 1 to 3 carbon atoms.

5. The process of claim 4 in which the phosphoroxy middle halide is phosphoroxy chloride.

6. A process for the preparation of propyl-1-propenyl amidodichlorophosphate which comprises reacting N-propyl propanaldimine and phosphoroxy chloride in the presence of a tertiary amine at a temperature between about 40° C. and about 150° C.

7. A process for the preparation of N-methyl-isopropenylamidodibromophosphate which comprises reacting N-methyl dimethylketimine and phosphoroxy bromide in the presence of a tertiary amine at a temperature between about 40° C. and about 150° C.

No references cited.